United States Patent
Leung et al.

(10) Patent No.: US 7,073,062 B2
(45) Date of Patent: Jul. 4, 2006

(54) METHOD AND APPARATUS TO MUTUALLY AUTHENTICATION SOFTWARE MODULES

(75) Inventors: Lok Yan Leung, Austin, TX (US); Anthony Joseph Nadalin, Austin, TX (US); Bruce Arland Rich, Round Rock, TX (US); Thoedore Jack London Shrader, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 09/740,600

(22) Filed: Dec. 19, 2000

(65) Prior Publication Data

US 2003/0037239 A1 Feb. 20, 2003

(51) Int. Cl.
*G06F 11/30* (2006.01)
*G60F 12/14* (2006.01)

(52) U.S. Cl. .................... 713/169; 713/169; 713/176; 713/187; 713/200; 717/10

(58) Field of Classification Search ................ 713/169, 713/176, 187, 200; 717/10
See application file for complete search history.

(56) References Cited

U.S. PATENT DOCUMENTS

| | | | | |
|---|---|---|---|---|
| 5,568,552 A | * | 10/1996 | Davis | 705/59 |
| 6,157,960 A | * | 12/2000 | Kaminsky et al. | 719/315 |
| 6,192,476 B1 | * | 2/2001 | Gong | 713/201 |
| 6,226,746 B1 | * | 5/2001 | Scheifler | 713/200 |
| 6,324,645 B1 | * | 11/2001 | Andrews et al. | 713/157 |
| 6,571,252 B1 | * | 5/2003 | Mukherjee | 707/10 |
| 6,615,350 B1 | * | 9/2003 | Schell et al. | 713/168 |
| 6,721,888 B1 | * | 4/2004 | Liu et al. | 713/191 |

* cited by examiner

*Primary Examiner*—Taghi T. Arani
(74) *Attorney, Agent, or Firm*—Jeffrey S. LaBaw; Joseph R. Burwell

(57) ABSTRACT

In response to initiating a call from a first class to a second class, an instantiation of the second class is initiated. While performing the instantiation of the second class, a class constructor for the second class is called, which determines a codebase for the first class and attempts to verify a digital signature on it. In response to a successful verification, the instantiation of the second class is successfully completed. In response to successfully completing the instantiation of the second class, a codebase for the second class is determined by the first class, and an attempt is made by the first class to verify a digital signature on the codebase for the second class. In response to a successful verification of the digital signature on the codebase for the second class, the call from the instance of the first class to the instance of the second class is performed.

18 Claims, 3 Drawing Sheets

METHOD AND APPARATUS TO MUTUALLY AUTHENTICATION SOFTWARE MODULES

BACKGROUND

1. Field of the Invention

The present invention relates to an improved data processing system, and, in particular, to a method and apparatus for multi-computer data transfer. Still more particularly, the present invention provides a method and apparatus for dynamic user and/or data authentication between anonymous code.

2. Description of Related Art

Many entities rely on the interconnected aspect of the computing world as we know today. The proliferation of activity in an interconnected environment allows for software to be written and distribute on a wide scale. As such, digital certificates along with public key/private key cryptography allow for a certain level of trust in using signed software obtained through electronic means.

However, typical software does not contain the means to verify, authenticate, or authorize other modules, as well as having the other modules perform the same processes in return. Typical software requires human intervention of some sort to allow such mutual procedures.

Additionally, with many enterprise type software applications that run on distributed systems, or remote source providers that provide plug-ins for users to connect with, software segments or executables interact with one another on a dynamic basis in a rapidly growing manner. This means that code is loaded, wired together, and used in a dynamic environment on an ever increasing basis.

For example, a company may have software that allows a user to access services and/or computer functionalities remotely. The software serves as a "spigot" for the services. A user may initiate contact with the software with their own "spigot" software, to any provider on a dynamic basis.

In this case, both the user and the provider need to mutually verify, authenticate, and/or authorize the other party's code and/or status. This functionality is not provided for in many typical applications, especially in the context of dynamically loadable anonymous software modules.

In another example, a provider may provide a system implementing a product in a plugable framework format. This allows the provider to make custom built systems in a convenient manner. However, the independent modules, when "wired" together, may need to verify, authenticate, and/or authorize other independent modules, to ensure a trusted relationship and that only the proper modules have been provided. Again, the functionality for the modules to mutually verify, authenticate, and/or authorize themselves is not provided in typical software solutions.

Many other problems and disadvantages of the prior art will become apparent to one skilled in the art after comparing such prior art with the present invention as described herein.

SUMMARY OF THE INVENTION

Various aspects of the present invention can be found in an architecture and method that allows for mutual identification, verification, or authorization of dynamically loaded software. In one embodiment of the invention, a calling class contains digital keys, or other verification, authentication, and/or authorization mechanisms, such as digital certificates granted in the context of a Public Key Infrastructure (PKI) schema.

When attempting to instantiate an invoked class, the calling class obtains a digitally signed codebase (location of the code and signers) of the invoked class. The calling class then uses the embedded public keys or certificates to verify the codebase signer. Additionally, the calling class may use the certificate to authenticate and/or authorize the implementation of the invoked class.

If the calling class cannot verify, authenticate, and/or authorize the invoked class, the constructor of the invoked class is not called. However, if the calling class verifies, authenticates, and/or authorizes the instantiation of the invoked class through the use of the signed codebase, the embedded public keys, and/or the embedded certificates, the calling class invokes the constructor of the invoked class in a normal manner.

In one implementation of the invention, the calling class contains obfuscated embedded public keys and/or root certificates relating to the signing of the invoked class. Additionally, the calling class may employ several "dummy" public keys and/or certificates and implement a randomly based verification technique using those dummy certificates and/or public keys, as well as the "real" public keys or certificates. In this case, only the calling class will know which is the proper set of verification tools implemented. Additionally, this allows a provider to hide the valid certificates from an unauthorized party attempting to decompile the obfuscated calling class and obtain the public keys and/or certificates.

As for the invoked class, the constructor for the invoked class contains a call to verify, authenticate, and/or authorize the calling class. The invoked class obtains access to a digitally signed codebase of the calling class. Contained within the invoked class is a set of certificates and/or public keys relating to the calling class. The invoked class verifies, authenticates, and/or authorizes the calling class by using the public keys and/or certificates of the calling class.

Using the public keys and/or certificates, the invoked class may verify the digitally signed calling class codebase. With the certificates, the invoked class may authorize and/or verify the digitally signed codebase of the calling class, as well as verify the digital signature with the public key contained within the certificate.

As such, a mutually verifying, authenticating, and/or authorizing code may be envisioned when the particular codes are dynamically loaded. Other aspects, advantages and novel features of the present invention will become apparent from the detailed description of the invention when considered in conjunction with the accompanying drawings.

DETAILED DESCRIPTION OF THE INVENTION

Figure 1:
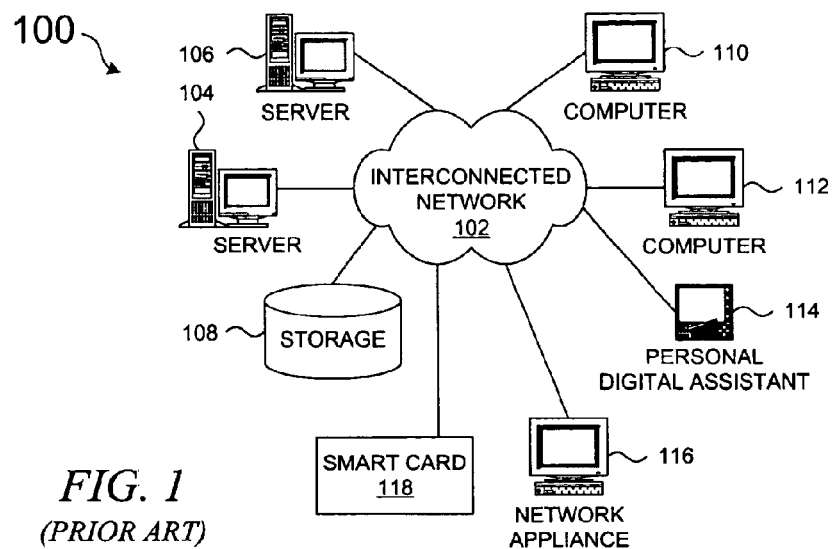
FIG. 1 is a schematic diagram of a typical network of data processing systems

FIG. 1 is a schematic diagram of a typical network of data processing systems. Any of the data processing systems of FIG. 1 may implement the present invention. A distributed data processing system 100 contains a network 102. The network 102 provides communications link between all the various devices and computers connected within the distributed processing system 100. The network 102 may include permanent connections, such as wire or fiber optic cables, or other types of connections such as wireless, satellite, or infrared network technology.

The network 102 may operate under a number of different operating schemes. Communications may flow between the associated components of the distributed processing system 100 under various protocols, including TCP/IP. The network 102 may also be indicative of several interconnected networks, such as the Internet.

The network 102 connects a server 104 and a server 106. Additionally, a storage unit 108 is also connected to the network 102, thus allowing the servers 104 and 106 to communicate with and store data to and from the storage unit 108. Other typical clients on the network 102 may be stand-alone computers 110 and 112.

Additional computing components connected to the network 10 may include a personal digital assistant 114 and a remote network appliance 116. Additionally, an individual user may carry a so-called "smart card" 118. The smart card may contain sufficient data and/or processing capabilities to allow connection to and communication with other components of the distributed data processing system 100.

It should also be noted that the distributed data processing system may also include numerous different types of networks. Any one of, or any combination of, for example, an intranet, a local area network (LAN), a wide area network (WAN), or an aggregation of units may be connected to each other in a fashion. The invention described herein may operate on any of the devices as related in FIG. 1, or across any network implementation as noted above. Additionally, embodiments of the invention could be implemented on a stand alone computing device.

If using the network in a secure fashion, the network may be local to the individual clients. Or such secure network may be implemented upon a public network using various security protocols, thus creating a virtual secure network (VSN) molded from the public network infrastructure. Also, the present invention may be implemented on a variety of hardware and software platforms, as described above.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical public key cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

When authenticating data, data can be signed by computing a digital signature from the data and the private key of the signer. Once the data is digitally signed, it can be stored with the identity of the signer and the signature that proves that the data originated from the signer. A signer uses a private key to sign data, and a receiver uses the public key to verify the signature. The present invention is directed to a form of authentication using digital certificates; some encryption is also performed during the processing within the present invention.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The CA usually has some kind of legal responsibilities for its vouching of the binding between a public key and its owner that allow one to trust the entity that signed a certificate. There are many such certificate authorities, such as VeriSign, Entrust, etc. These authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a company like VERISIGN that provides trusted third-party certificate authority services. The certificate authority will then generate the certificate and return it. The certificate may contain other information, such as dates during which the certificate is valid and a serial number. One part of the value provided by a certificate authority is to serve as a neutral and trusted introduction service, based in part on their verification requirements, which are openly published in their Certification Service Practices (CSP).

Figure 2:
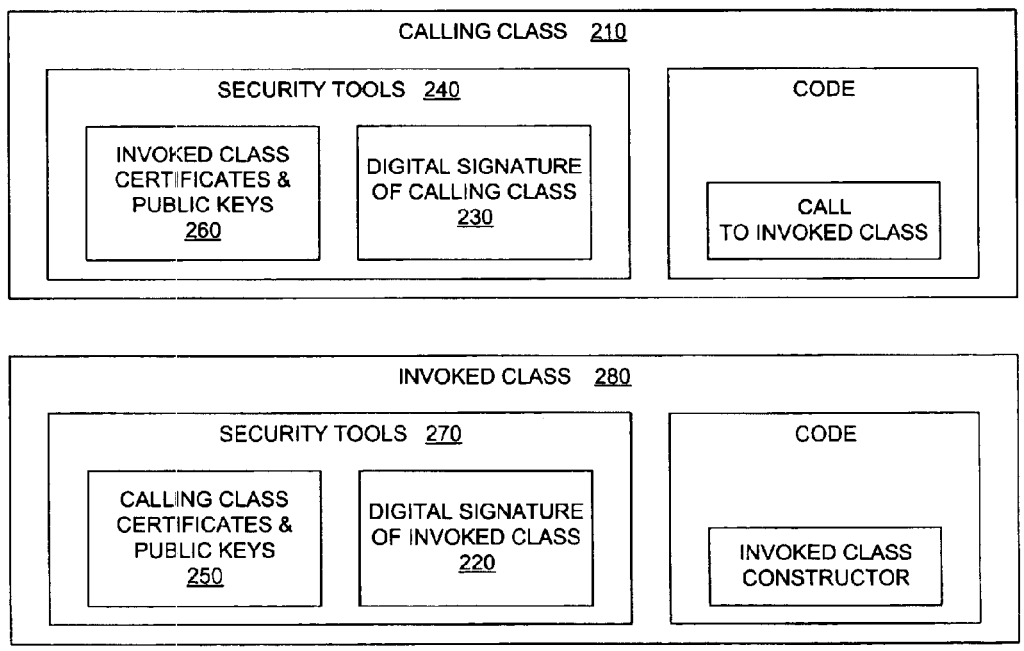
FIG. 2 is a schematic diagram of architecture of a dynamically mutual authenticating code, according to the invention.

FIG. 2 is a schematic diagram of architecture of a dynamically mutual authenticating code, according to the invention. A caller software module 210 contains security tools 240. In practice, these security tools 240 could include a digital signature 230 and a public key for that digital signature. Or, it could also be a certificate 260 containing information relating to the verification, authentication, and/or authorization functions common to many Public Key Infrastructure (PKI) systems.

In the course of operation, the caller software module 210 attempts to invoke a callee software module 280 through the use of a public constructor. During the course of instantiation, the callee software module 280 uses both its own security tools and the security tools of the calling class 110 to verify, authenticate, and/or authorize the calling software module 210.

In an exemplary embodiment, the callee software module 280 performs a validation of the digital signature of the caller software module 210 with the public key 250. This verifies the identity of the signer of the the caller module and that the caller software module 210 has not been tampered with, since, ostensibly, only the holder of the private key could make the digital signature 220. The invoked software module 280 can also use a certificate 250 contained within the invoked software module 280 to verify, authenticate, and/or authorize the caller software module 210 based upon the information and public keys contained in the certificate. The invoked class 280 contains the certificate 250, which it implicity trusts. The invoked class 280 uses the public keys contained therein to verify the codebase of the caller class 210. Or, other authorization steps may be accomplished through the use of the certificate within many different public key infrastructure (PKI) techniques known in the art.

In this manner, the invoked class 280 utilizes the digital signature 230 and the security tools 250 to verify, authenticate, and/or authorize the caller software module 210.

One skilled in the art will recognize that many different encryption algorithms may be used in the in the public key/secret key system used here, and the methods for providing a digital signature of data and/or objects is well known in the art. Additionally, many different authentication certificates exist and are currently implemented through PKI technologies from many sources.

In another exemplary embodiment, the callee software module 280 may use the certificate 260 and/or public keys contained within the caller software module 210 to both verify and authenticate the caller software module 210. In this case, the caller software module 210 is digitally signed with a private key, and this signature is placed into the caller software module 210.

The certificate 260 contains a public key so that the invoked class may validate the digital signature. Additionally, the invoked module may use the embedded certificate 260 to authenticate and/or authorize the calling class 210.

The invoked class software module 280 verifies, authenticates, and/or authorizes the codebase of the calling class software module. This occurs when the invoked class software module 280 performs these actions in its constructor.

This may be accomplished through the invoked class verifying the codebase of the calling class 210 through the validation of digital signature contained in the calling class 210. Additionally, other verification, authentication, and/or authorization steps may performed through the use of the digital certificate contained in the invoked class 280.

If these steps fail, the invoked class constructor fails. When the constructor fails, the calling class 210 is unable to use or access the functionality of the invoked class 280.

This ensures that the calling class 210 is able to instantiate and use the invoked class implementation only after having been successfully verified, authenticated, and/or authorized by the invoked class. Several levels or types of authentication or authorization may be employed, such as authentications as to whether the entity is able to use specific classes, which specific classes may be licensed for use, or whether the entity is still using the software in a valid timeframe as dictated by a provider, to name but a few possible.

Turning now to how the calling class 210 verifies the invoked class 280, upon a request to instantiate the invoked class 280, the calling class 210 first performs an authentication, verification, and/or authorization of the invoked class 280. If the authentication, verification, and/or authorization steps related to the invoked class 280 fail, the calling class 210 simply does call the constructor of or otherwise does not instantiate the invoked class 280.

To aid in this task, the calling class 210 contains one or more trusted public keys 260, certificates, or other security tools embedded within the calling class 210. The calling class 210 initiates the verification, authentication, and/or authorization the invoked class by finding the codebase of the invoked class 260, including location and signers, of the invoked class.

The calling class 210 then verifies the signature of the invoked class 280 with the certificates and public keys embedded in the calling program. If the calling class cannot verify, authenticate, and/or authorize the invoked class 280, then the constructor of the invoked class 280 is not run by the calling class 210.

In essence each module has a set of security tools indicating or allowing it to deduce the modules that it trusts. These security tools can be security certificates or public keys that it trusts. Thus, each of the modules finds the code source of the module in question and verifies the signature on the module with the embedded security tools. Or it may use the embedded security tools to perform higher levels of authentication and/or authorization that can be implemented in a PKI schema.

Figure 3:
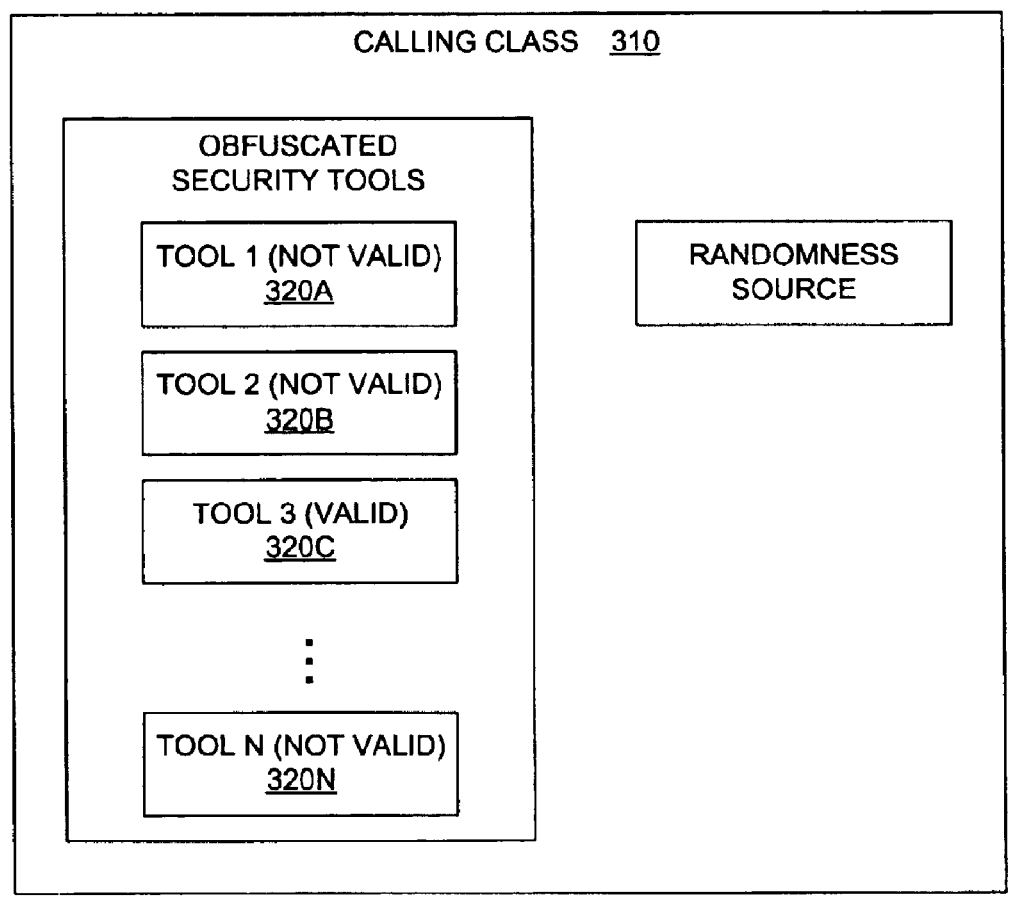
FIG. 3 is a block diagram of an embodiment of the certificates relating to the invoked class according to the invention.

In one embodiment, the certificates 260 are so-called "root" certificates, thus ensuring the authenticity and the veracity of the invoked class 280 at a high level of trust. As such, the need exists to ensure the security of the root certificates themselves. In this case, more than one certificate is used, and is thus explained in detail below FIG. 3 is a block diagram of an embodiment of the certificates relating to the invoked class according to the invention of FIG. 2. In this case, a plurality of certificates 320a–n is provided in the calling class 310. When implementing the invention in JAVA, the certificates are "obfuscated", or kept from view. In this manner, a preliminary level of security may be maintained for these certificates.

In this implementation, one of the certificates 320a–n is the "real" certificate, and the others are false. This implementation of multiple verification tools adds an extra level of security to the scheme.

Additionally, the calling class 310 can perform a number of verification and authentication steps using the certificates 320a–n. The certificates may be verified according to some process with an inherent source of randomness. Thus, the calling class 310 knows which certificate request should be granted and which ones should not. However, an outside observer, or even an observer who gained access to the obfuscated certificates, could not be assured which certificate was authentic and which was not.

As such, the calling class code performs the validation, authentication, and/or authorization steps with both a good certificate and also a bad certificate. These steps are done in a random pattern known only to the calling class. In this manner, an unauthorized individual is prevented from decompiling the class, finding the certificate, and replacing it.

Additionally, the multiple security tools 320a–n allow for multiple types of invoked classes to interconnect with the calling class 310. For example, the security tool 320a may be invalid with respect to a first invoked class. However, the security tool 320a may be valid with respect to a second invoked class. In this manner, the calling class can be used for multiple interconnections with other invoked classes. In addition, multiple security tools may be employed in a similar manner for the invoked class as well. In this manner, a portable interface can be used in a secure manner for multiple interfaces.

Figure 4:
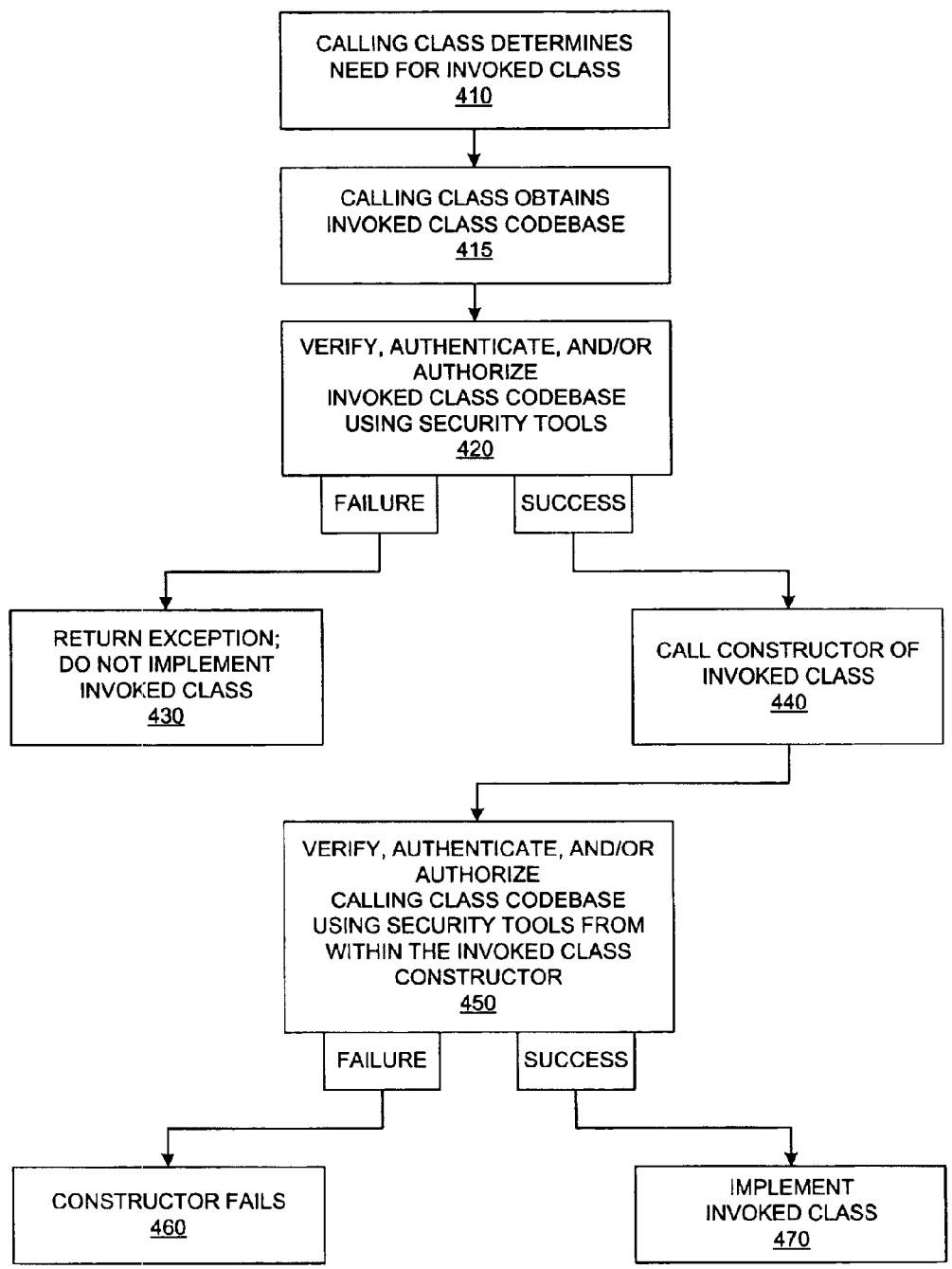
FIG. 4 is a block diagram of a method by which the invention may be implemented.

FIG. 4 is a block diagram of a method by which the invention of FIG. 2 may be implemented. In a block 410, the calling class determines that it needs to instantiate an invoked class. The calling class obtains the codebase of the invoked class in a block 415.

The module is digitally signed, or may contain or employ other verification means, such as a certificate. The calling class then uses the verification means to verify, authenticate, and/or authorize the module. As such, the invoked class is checked using the keys and/or certificates that the calling class holds internally in a block 420, as explained in the sections above relating to FIGS. 2 and 3.

If the verification, authentication, and/or authorization steps fail, the calling class does not attempt to invoke the invoked class. In this case it returns an exception in a block 430.

However, if the verification, authentication, and/or authorization steps succeed, the calling class invokes the constructor of the invoked class in a block 440. In this case, the invoked class is constructed by the means inherent in the invoked class to do so.

In a block 450, the invoked class, in its constructor, performs verification, authentication, and/or authorization steps relating to the calling class, as detailed previously in relation to FIG. 2. If the verification, authentication, and/or authorization steps fail, the constructor fails and control returns to the calling class in a block 460.

However, if the verification, authentication, and/or authorization steps are successful, the invoked class constructor passes to successful completion in a block 470. This allows the invoked class and the calling class to operate and interact in a normal manner.

In an exemplary implementation, the calling class and invoked class are implemented in JAVA, and the digital signatures are those of the particular jar file of each class, respectively. In this case, the schema may use the digital signature mechanisms provided by the JAVA RUNTIME ENVIRONMENT (JRE). The JRE includes JAVA CRYPTOGRAPHY ARCHITECTURE (JCA), which in turn provides implementation for many different signature algorithms.

Thus, an architecture for implementing a mutual authentication and verification of dynamically loaded software is detailed. It should be noted that such an architecture may be implemented with a computing device. The computing device may be a general purpose or specialized computing device. It should also be noted that the architecture may be implemented as software run on the computing device and within such components as magnetic media or computer memory associated with the computing device.

In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A method for authenticating software modules that execute on a data processing system, the method comprising:

executing an instance of a first class on the data processing system;

in response to initiating a call from the instance of the first class to a second class, initiating an instantiation of the second class to create an instance of the second class;

while performing the instantiation of the second class, calling a class constructor for the second class;

during execution of the class constructor for the second class, determining a codebase for the first class;

during execution of the class constructor for the second class, attempting by the second class to verify a digital signature on the codebase for the first class;

in response to a successful verification of the digital signature on the codebase for the first class, successfully completing the instantiation of the second class;

in response to successfully completing the instantiation of the second class, determining by the first class a codebase for the second class;

in response to determining by the first class the codebase for the second class, attempting by the first class to verify a digital signature on the codebase for the second class; and in response to a successful verification of the digital signature on the codebase for the second class, performing the call from the instance of the first class to the instance of the second class.

2. The method of claim 1 further comprising:

in response to an unsuccessful verification of the digital signature on the codebase for the first class, unsuccessfully completing the instantiation of the second class.

3. The method of claim 1 further comprising:

in response to an unsuccessful verification of the digital signature on the codebase for the second class, failing to perform the call from the instance of the first class to the instance of the second class.

4. The method of claim 1 further comprising:

using a trusted digital certificate or a trusted public key embedded in the instance of the first class in attempting by the first class to verify a digital signature on the codebase for the second class.

5. The method of claim 1 further comprising:

employing, in accordance with a source of randomness, a trusted digital certificate from multiple digital certificates embedded in the instance of the first class in attempting by the first class to verify a digital signature on the codebase for the second class, wherein the trusted digital certificate is obfuscated from viewing in the codebase for the first class.

6. The method of claim 1 further comprising:

using a trusted digital certificate or a trusted public key embedded in the instance of the second class in attempting by the second class to verify a digital signature on the codebase for the first class.

7. An apparatus for authenticating software modules that execute on a data processing system, the apparatus comprising:

means for executing an instance of a first class on the data processing system;

means for initiating an instantiation of the second class to create an instance of the second class in response to initiating a call from the instance of the first class to a second class;

means for calling a class constructor for the second class while performing the instantiation of the second class;

means for determining a codebase for the first class during execution of the class constructor for the second class;

means for attempting by the second class to verify a digital signature on the codebase for the first class during execution of the class constructor for the second class;

means for successfully completing the instantiation of the second class in response to a successful verification of the digital signature on the codebase for the first class;

means for determining by the first class a codebase for the second class in response to successfully completing the instantiation of the second class;

means for attempting by the first class to verify a digital signature on the codebase for the second class in response to determining by the first class the codebase for the second class; and means for performing the call from the instance of the first class to the instance of the second class in response to a successful verification of the digital signature on the codebase for the second class.

8. The apparatus of claim 7 further comprising:

means for unsuccessfully completing the instantiation of the second class in response to an unsuccessful verification of the digital signature on the codebase for the first class.

9. The apparatus of claim 7 further comprising:

means for failing to perform the call from the instance of the first class to the instance of the second class in response to an unsuccessful verification of the digital signature on the codebase for the second class.

10. The apparatus of claim 7 further comprising:

means for using a trusted digital certificate or a trusted public key embedded in the instance of the first class in attempting by the first class to verify a digital signature on the codebase for the second class.

11. The apparatus of claim 7 further comprising:

means for employing, in accordance with a source of randomness, a trusted digital certificate from multiple digital certificates embedded in the instance of the first class in attempting by the first class to verify a digital signature on the codebase for the second class, wherein the trusted digital certificate is obfuscated from viewing in the codebase for the first class.

12. The apparatus of claim 7 further comprising:

means for using a trusted digital certificate or a trusted public key embedded in the instance of the second class in attempting by the second class to verify a digital signature on the codebase for the first class.

13. A computer program product on a computer readable medium for use in a data processing system for authenticating software modules that execute on the data processing system, the computer program product comprising:

instructions for executing an instance of a first class on the data processing system;

instructions for initiating an instantiation of the second class to create an instance of the second class in response to initiating a call from the instance of the first class to a second class;

instructions for calling a class constructor for the second class while performing the instantiation of the second class;

instructions for determining a codebase for the first class during execution of the class constructor for the second class;

instructions for attempting by the second class to verify a digital signature on the codebase for the first class during execution of the class constructor for the second class;

instructions for successfully completing the instantiation of the second class in response to a successful verification of the digital signature on the codebase for the first class;

instructions for determining by the first class a codebase for the second class in response to successfully completing the instantiation of the second class;

instructions for attempting by the first class to verify a digital signature on the codebase for the second class in response to determining by the first class the codebase for the second class; and instructions for performing the call from the instance of the first class to the instance of the second class in response to a successful verification of the digital signature on the codebase for the second class.

14. The computer program product of claim 13 further comprising:

instructions for unsuccessfully completing the instantiation of the second class in response to an unsuccessful verification of the digital signature on the codebase for the first class.

15. The computer program product of claim 13 further comprising:

instructions for failing to perform the call from the instance of the first class to the instance of the second class in response to an unsuccessful verification of the digital signature on the codebase for the second class.

16. The computer program product of claim 13 further comprising:

instructions for using a trusted digital certificate or a trusted public key embedded in the instance of the first class in attempting by the first class to verify a digital signature on the codebase for the second class.

17. The computer program product of claim 13 further comprising:

instructions for employing, in accordance with a source of randomness, a trusted digital certificate from multiple digital certificates embedded in the instance of the first class in attempting by the first class to verify a digital signature on the codebase for the second class, wherein the trusted digital certificate is obfuscated from viewing in the codebase for the first class.

18. The computer program product of claim 13 further comprising:

instructions for using a trusted digital certificate or a trusted public key embedded in the instance of the second class in attempting by the second class to verify a digital signature on the codebase for the first class.

* * * * *